United States Patent
Vanni et al.

(10) Patent No.: US 9,212,705 B2
(45) Date of Patent: Dec. 15, 2015

(54) TORQUE CONVERTER WITH AN INPUT SHAFT CENTERING FEATURE

(71) Applicant: Schaeffler Technologies AG & Co. KG, Herzogenaurach (DE)

(72) Inventors: Jeremy Vanni, Sterling, OH (US); Brian C. Zaugg, Millersburg, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 55 days.

(21) Appl. No.: 13/778,502

(22) Filed: Feb. 27, 2013

(65) Prior Publication Data

US 2013/0233664 A1    Sep. 12, 2013

Related U.S. Application Data

(60) Provisional application No. 61/607,133, filed on Mar. 6, 2012.

(51) Int. Cl.
| | |
|---|---|
| *F16D 33/00* | (2006.01) |
| *F16D 33/18* | (2006.01) |
| *F16H 41/24* | (2006.01) |
| *F16F 15/12* | (2006.01) |

(52) U.S. Cl.
CPC ............ *F16D 33/18* (2013.01); *F16F 15/1207* (2013.01); *F16H 41/24* (2013.01)

(58) Field of Classification Search
CPC .................................. F16H 45/02; F16D 33/18
USPC .............................. 192/3.29, 55.61; 74/574.2
See application file for complete search history.

(56) References Cited

U.S. PATENT DOCUMENTS

| | | | |
|---|---|---|---|
| 7,143,879 B2 * | 12/2006 | Ackermann et al. | 192/3.29 |
| 7,150,148 B2 | 12/2006 | Takabayashi | |
| 2009/0013682 A1 | 1/2009 | Vansickle | |
| 2009/0032351 A1 | 2/2009 | Uhler | |
| 2009/0045023 A1 * | 2/2009 | Uhler | 192/3.29 |
| 2011/0287844 A1 * | 11/2011 | Steinberger | 464/68.8 |

* cited by examiner

*Primary Examiner* — Robert Hodge
*Assistant Examiner* — Tinh Dang
(74) *Attorney, Agent, or Firm* — Simpson & Simpson, PLLC

(57) ABSTRACT

A torque converter, including: a cover arranged to receive torque from an engine; a centering flange fixedly connected to the cover and including a radially outwardly facing surface; a turbine; and a vibration damper with a first input component and a flange arranged to contact and engage an input shaft for a transmission to transmit torque to the input shaft. The torque converter includes: a torque convert clutch including a piston plate fixedly connected to the first input component, the piston plate including: a radially innermost distal end arranged to at least indirectly engage the input shaft; and a radially inwardly facing surface at least indirectly engaged with the radially outwardly facing surface.

19 Claims, 2 Drawing Sheets

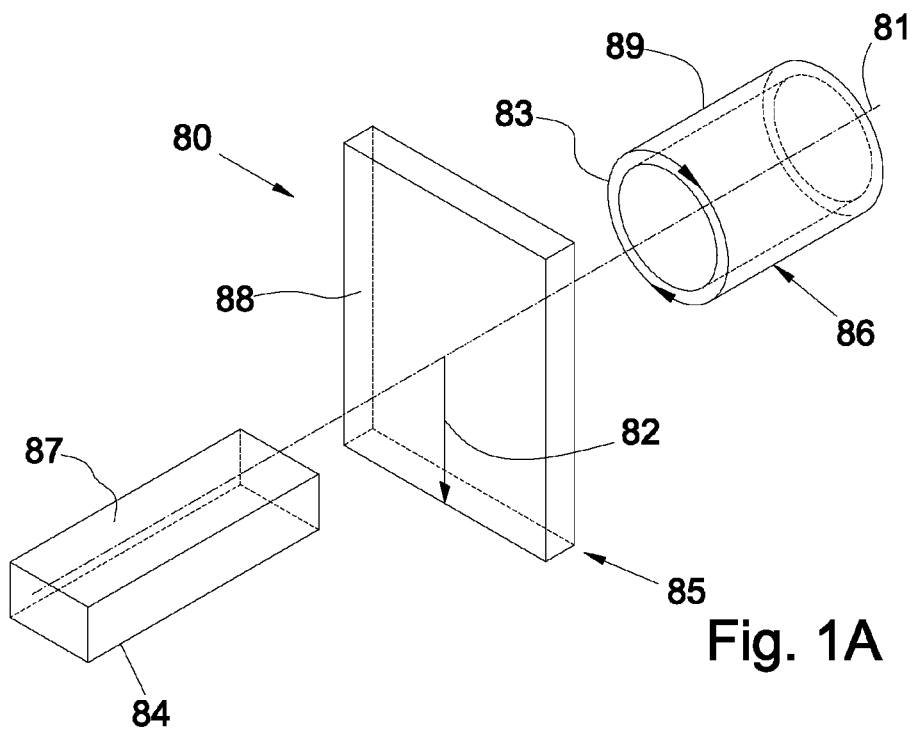
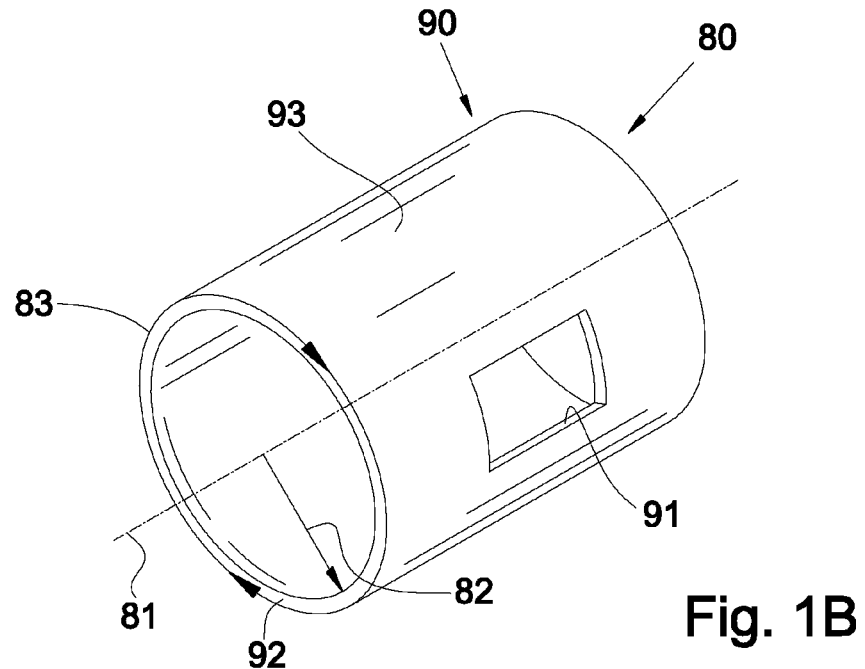
Fig. 1A
Fig. 1B

TORQUE CONVERTER WITH AN INPUT SHAFT CENTERING FEATURE

CROSS-REFERENCE TO RELATED APPLICATIONS

This application claims the benefit under 35 U.S.C. §119(e) of U.S. Provisional Patent Application No. 61/607,133, filed Mar. 6, 2012, which application is incorporated herein by reference.

TECHNICAL FIELD

The present disclosure relates to a torque converter with a feature for centering an input shaft for a transmission with an engine driving the torque converter.

BACKGROUND

It is know to use an output hub in a torque converter to provide centering an input transmission shaft with respect to an engine driving the torque converter. A torque converter without an output hub and with a single clutch plate lacks means for centering an input transmission shaft with respect an engine driving the torque converter.

U.S. Pat. No. 7,150,148 teaches an input shaft centered in a converter pilot. Commonly owned U.S. Patent Application Publication No. 2009/0032351 teaches centering an input shaft using sheet metal components fixed to the cover. Commonly owned U.S. Patent Application Publication No. 2009/0032351 teaches centering an input shaft using a twin plate piston and hub. The twin plate piston is connected to a cover by leaf springs.

SUMMARY

According to aspects illustrated herein, there is provided a torque converter, including: a cover arranged to receive torque from an engine; a centering flange fixedly connected to the cover and including a radially outwardly facing surface; a turbine; and a vibration damper with a first input component and a flange arranged to contact and engage an input shaft for a transmission to transmit torque to the input shaft. The torque converter includes: a torque convert clutch including a piston plate fixedly connected to the first input component, the piston plate including: a radially innermost distal end arranged to at least indirectly engage the input shaft; and a radially inwardly facing surface at least indirectly engaged with the radially outwardly facing surface.

According to aspects illustrated herein, there is provided a turbine for a torque converter, including: a cover arranged to receive torque from an engine; a centering flange fixedly connected to the cover; a turbine; and a vibration damper with a first input component and a flange arranged to contact and engage an input shaft for a transmission to transmit torque to the input shaft. The torque converter includes: a torque convert clutch including a radially innermost end and a piston plate fixedly connected to the first input; a first bushing in contact with the radially innermost end and including a radially inwardly facing surface arranged to contact the input shaft; and a second bushing in contact with the centering flange and the piston plate.

According to aspects illustrated herein, there is provided a turbine for a torque converter, including: a cover arranged to receive torque from an engine; a centering flange fixedly connected to the cover; a turbine; and a vibration damper with a first input component and a flange arranged to contact and engage an input shaft for a transmission to transmit torque to the input shaft. The torque converter includes: a torque convert clutch including: a radially innermost end; a piston plate fixedly connected to the first input; and friction material disposed between the cover and the piston plate. The torque converter includes: a first bushing in contact with the radially innermost end and including a radially inwardly facing surface arranged to contact the input shaft; and a second bushing in contact with the centering flange and the piston plate. The first bushing is arranged to center the input shaft with respect to the piston plate. The second bushing is arranged to center the piston plate with respect to the cover. When the clutch is closed both the piston plate and the cover are in contact with the friction material.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1A is a perspective view of a cylindrical coordinate system demonstrating spatial terminology used in the present application;

FIG. 1B is a perspective view of an object in the cylindrical coordinate system of FIG. 1A demonstrating spatial terminology used in the present application; and, FIG. 2 is a partial cross-sectional view of a torque converter with a centering flange.

DETAILED DESCRIPTION

Figure 2:
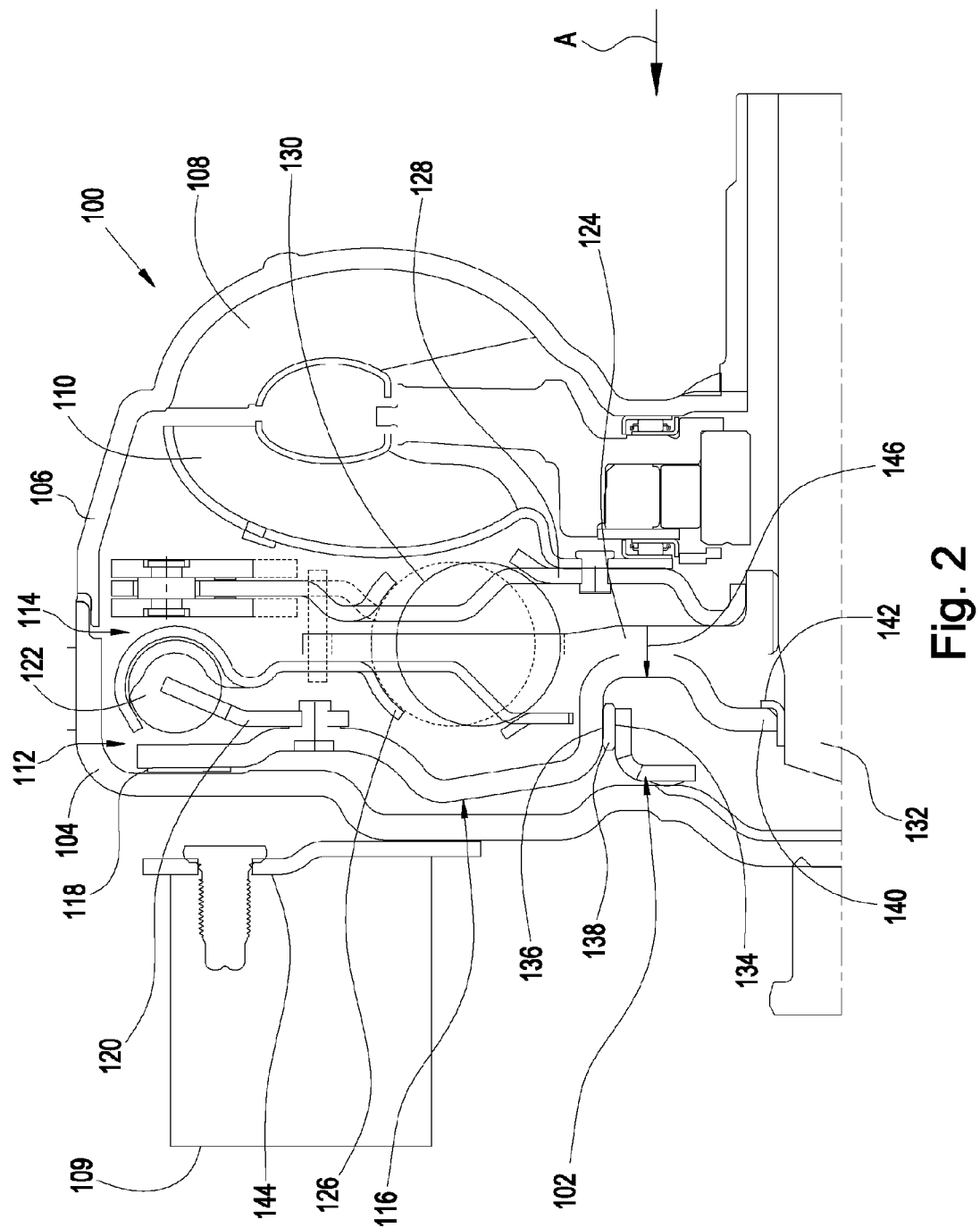

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

FIG. 2 is a partial cross-sectional view of torque converter 100 with centering flange 102. Torque converter 100 includes cover 104 fixedly connected to pump shell 106 for pump 108. and arranged to receive torque from engine 109. The torque converter also includes turbine 110, torque converter clutch 112, and multi-stage vibration damper 114. The clutch includes piston plate 116 and friction material 118, disposed between the cover and the piston plate. The friction material can be fixed to the cover or the piston plate or can be free of a fixed connection to the cover or the piston plate. The piston plate is drivingly engaged to drive plate 120 for the vibration damper, which is engaged with at least one spring 122 for the vibration damper. By "drivingly engaged" we mean that the piston plate and drive plate are directly or indirectly connected such that torque from the piston plate is transmitted to the drive plate via the driving engagement. Advantageously, flange 102 is separately formed from the cover, reducing the complexity of the fabrication process for the cover. For example, it is simpler to provide the flange as a separated piece that is easily fabricated, for example by metal stamping, than to form a shape in the cover. Thus, flange 102 can be a stamped metal piece that is fixed to the cover by projection welding.

The drive plate is an input to the vibration damper. That is, when the clutch is closed, and the cover, friction material, and piston plate are in contact, torque can be transferred from the cover to the drive plate via the clutch. The torque then is transmitted from spring 122 to output flange 124 via cover plates 126 and 128 and at least one spring 130. Flange 124, is an output for the vibration damper. The output flange is arranged to engage input shaft 132 for a transmission and transmit torque to the input shaft. That is, the flange is directly engaged with the input shaft, without an intervening flange hub or output hub. The turbine is fixedly connected to cover plate 128 for the vibration damper. Torque from the turbine is transmitted to the flange via cover plates 126 and 128 and spring 130. Thus, cover plate 128 is an input to the vibration damper.

The centering flange is fixedly connected to the cover and includes radially outwardly facing surface 134. The piston plate includes radially inwardly facing surface 136 at least indirectly engaged with surface 134. In an example embodiment, bushing 138 is disposed between the piston plate and the centering flange in contact with surfaces 134 and 136. The piston plate includes radially innermost distal end 140 arranged to at least indirectly engage the input shaft. In an example embodiment, bushing 142 is disposed at end 140 in contact with end 140 and is arranged to contact the input shaft.

The centering flange and bushing 138 center the piston plate with respect to the cover and an engine connected to the cover, for example at drive plate 144. Piston plate 116, in particular, end 140, and bushing 142 center the input shaft. Thus, the input shaft also is centered with respect to the cover and the engine via the piston plate.

Eliminating an output hub from a torque converter reduces cost, weight, component count, complexity, and size for the torque converter. However, as noted above, output hubs are used to center an input shaft with an engine driving the torque converter. Advantageously, the configuration of centering flange 102, piston plate 116, and flange 124 centers input shaft 132 without the use of an output hub. Since there is no output hub, the output flange is directly engaged with the input shaft. As noted above, the turbine is connected to the vibration damper such that torque from the turbine is transmitted to the output input shaft via the flange.

Use of a single plate torque converter clutch with a hub-less design further reduces cost, weight, component count, complexity, and size for a torque converter. However, as noted above, there are problems with centering an input shaft for a single plate/hubless configuration. Advantageously, the configuration of centering flange 102, piston plate 116, and flange 124 centers input shaft 132 without the use of an output hub and with clutch 112 being a single plate clutch.

The output flange is at least indirectly engaged with the piston plate to form a solid mechanical path 146 between the piston plate and the flange. Path 146 also is a thrust path for times when operation of the torque converter causes the output flange to displace in axial direction A. By solid mechanical path, we mean that the path is formed by solid material. For example, if the piston plate and the flange are in direct contact, the path is formed by solid material. If an intermediate piece is placed between the piston plate and the flange, a path of solid material from the piston plate, the flange, and the intermediate piece is present.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What we claim is:

1. A torque converter, comprising:
   a cover arranged to receive torque from an engine;
   a centering flange fixedly connected to the cover and including a radially outwardly facing surface;
   a turbine;
   a vibration damper with:
      a first input component; and,
      an output flange arranged to contact and engage an input shaft for a transmission to transmit torque to the input shaft;
   a torque converter clutch including a piston plate drivingly engaged with the first input component, the piston plate including:
      a radially innermost distal end arranged to engage the input shaft to center the input shaft with respect to the piston plate via a first bushing; and,
      a radially inwardly facing surface engaged with the radially outwardly facing surface of the centering flange via a second bushing.

2. The torque converter of claim 1, wherein the second bushing is in contact with the radially inwardly and outwardly facing surfaces.

3. The torque converter of claim 1, wherein the first bushing is in contact with the radially innermost distal end and arranged to contact the input shaft.

4. The torque converter of claim 1, wherein:
the at least indirect engagement of the radially inwardly facing surface with the radially outwardly facing surface is arranged to center the piston plate with respect to the cover.

5. The torque converter of claim 1, wherein:
the first bushing is in contact with the radially innermost distal end arranged to contact the input shaft; and,
the second bushing is in contact with the radially inwardly and outwardly facing surfaces.

6. The torque converter of claim 5, wherein:
the first bushing is arranged to center the input shaft with respect to the piston plate; and,
the second bushing is arranged to center the piston plate with respect to the cover.

7. The torque converter of claim 1, wherein:
the torque converter clutch includes friction material disposed between the cover and the piston plate; and,
when the clutch is closed both the piston plate and the cover are in contact with the friction material.

8. The torque converter of claim 1, wherein the output flange and the piston plate are at least indirectly engaged such that axial movement of the output flange toward the piston plate results in an equal axial movement of the piston plate.

9. The torque converter of claim 8, wherein output the flange and the piston plate are in contact.

10. The torque converter of claim 1, wherein the piston is rotatable with respect to the cover and the centering flange.

11. The torque converter of claim 1, wherein the vibration damper includes a second input component fixedly connected to the turbine.

12. A torque converter, comprising:
a cover arranged to receive torque from an engine; a centering flange fixedly connected to the cover; a turbine;
a vibration damper with:
a first input component; and,
an output flange arranged to contact and engage an input shaft for a transmission to transmit torque to the input shaft;
a radially innermost distal end; and,
a piston plate fixedly connected to the first input component; a first bushing:
in contact with the radially innermost distal end; and,
including a radially inwardly facing surface arranged to:
contact the input shaft;
center the input shaft with respect to the piston; and,
seal the piston against the input shaft; and,
a second bushing in contact with the centering flange and the piston plate.

13. The torque converter of claim 12 wherein:
the second bushing is arranged to center the piston plate with respect to the cover.

14. The torque converter of claim 12, wherein:
the torque converter clutch includes friction material disposed between the cover and the piston plate; and,
when the clutch is closed both the piston plate and the cover are in contact with the friction material.

15. The torque converter of claim 12, wherein the output flange and the piston plate are in contact.

16. The torque converter of claim 12, wherein the vibration damper includes a second input component fixedly connected to the turbine.

17. A torque converter, comprising:
a cover arranged to receive torque from an engine; a centering flange fixedly connected to the cover; a turbine;
a vibration damper with:
a first input component; and,
an output flange arranged to contact and engage an input shaft for a transmission to transmit torque to the input shaft;
a piston plate fixedly connected to the first input component and with a radially innermost distal end; and,
friction material disposed between the cover and the piston plate;
a first bushing in contact with the radially innermost distal end and arranged to contact the input shaft; and,
a second bushing in contact with the centering flange and the piston plate, wherein: the first bushing is arranged to center the input shaft with respect to the piston plate and to seal the piston plate against the input shaft;
the second bushing centers the piston plate with respect to the cover; and, when the clutch is closed both the piston plate and the cover are in contact with the friction material.

18. The torque converter of claim 17, wherein the output flange and the piston plate are in contact.

19. The torque converter of claim 17, wherein the vibration damper includes a second input component fixedly connected to the turbine.

* * * * *